United States Patent [19]

Lefkowitz

[11] Patent Number: 5,077,116

[45] Date of Patent: Dec. 31, 1991

[54] FORMING FABRIC HAVING A NONWOVEN SURFACE COATING

[76] Inventor: Leonard R. Lefkowitz, 14 Alpine Dr., Latham, N.Y. 12110

[21] Appl. No.: 610,307

[22] Filed: Nov. 9, 1990

Related U.S. Application Data

[63] Continuation of Ser. No. 357,702, May 26, 1989, abandoned.

[51] Int. Cl.⁵ .............................. D21F 1/10; B32B 5/08
[52] U.S. Cl. ..................................... 428/141; 162/348; 162/351; 162/DIG. 1; 428/237; 428/240; 428/283; 428/245; 428/246; 428/247; 428/280; 428/282; 428/198; 428/300; 428/143; 428/147; 428/323; 428/327; 428/255; 428/292; 428/293; 428/294; 428/236; 428/233; 428/296; 428/373; 428/395; 428/481
[58] Field of Search ................. 162/DIG. 1, 348, 351; 428/237, 240, 283, 245, 246, 247, 280, 282, 198, 300, 143, 147, 323, 327, 255, 292, 293, 294, 236, 233, 141, 296, 373, 395, 481

[56] References Cited

U.S. PATENT DOCUMENTS

| | | | |
|---|---|---|---|
| 3,617,442 | 11/1971 | Hurschman | 162/DIG. 1 |
| 4,151,323 | 4/1979 | Christie | 428/280 X |
| 4,283,454 | 8/1981 | Buchanan | 162/DIG. 1 |
| 4,357,386 | 11/1982 | Luciano et al. | 428/283 X |
| 4,439,273 | 3/1984 | Curry | 428/282 X |
| 4,541,895 | 9/1985 | Albert | 162/DIG. 1 |
| 4,571,359 | 2/1986 | Dutt | 428/DIG. 1 |
| 4,601,942 | 7/1986 | Finn et al. | 428/280 X |
| 4,657,806 | 4/1987 | Dutt | 428/237 X |
| 4,752,519 | 6/1988 | Boyer et al. | 162/DIG. 1 |

FOREIGN PATENT DOCUMENTS

| | | | |
|---|---|---|---|
| 0070708 | 1/1983 | European Pat. Off. | 162/348 |
| 3404544 | 8/1985 | Fed. Rep. of Germany | 162/348 |
| 419125 | 5/1966 | Japan | 162/DIG. 1 |
| 4744444 | 9/1972 | Japan | 162/DIG. 1 |
| 1236780 | 6/1971 | United Kingdom . | |

OTHER PUBLICATIONS

Anonymous "Research Disclosure" No. 189, pub. Jun. 180, Abstract #18923.

*Primary Examiner*—Ellis P. Robinson
*Assistant Examiner*—William P. Watkins, III
*Attorney, Agent, or Firm*—Witherspoon & Hargest

[57] ABSTRACT

This invention is directed to an improved forming fabric for papermaking machines having a transverse nonwoven sheet contact layer adhered to a base fabric layer, the fluid flow passageways between adjacent structural members in the nonwoven sheet contact layer being smaller than the fluid flow passageways in the adjacent base fabric layer and in fluid communication with the nonwoven sheet contact surface or the nonwoven surface adjacent to the base fabric or both. The sheet contact layer may be comprised of fibers, filaments, monofilaments, open cell foam or the like.

9 Claims, 5 Drawing Sheets

FORMING FABRIC HAVING A NONWOVEN SURFACE COATING

This application is a continuation of application Ser. No. 07/357,702, filed May 26, 1989, now abandoned.

BACKGROUND OF THE INVENTION

This invention relates to improved forming fabrics for papermaking.

It has long been known that to provide maximum resistance to abrasion in forming fabrics, large wear resistant yarns must be used. However, when such yarns are used in single layer woven fabrics, the resultant meshes are not fine enough to prevent the loss of fines through the fabric and paper quality suffers in terms of wire mark and noticeable sheet two sidedness.

In the case of single layer woven fabrics for papermaking, a delicate balance must be made between making the fabric mesh too fine with consequent reduced wear life, and making the fabric too coarse at the expense of sheet quality.

To overcome these drawbacks, there has been an ever increasing trend in recent years toward replacement of single layer forming fabrics with multiple layer forming fabrics. Such multiple layer woven forming fabrics may be woven with fine mesh in the sheet contact side and coarse mesh in the wear side of the fabric.

While providing at least a partial solution to the operational drawbacks of single layer woven forming fabrics, the multi layer forming fabrics are much more costly and time consuming to manufacture since they invariably contain finer yarns and more of them than in the equivalent single layer fabrics. In some cases, new machinery may be needed to weave the more sophisticated multi layer fabrics. In fact, at almost every step in the manufacturing sequence, the process is slowed down because of the higher number of yarns involved and the need for greater attention to detail to avoid fabric damages.

This trend toward more intricate weaves and multi layer fabrics has taken place as a direct result of the need to achieve higher paper quality standards at ever increasing paper machine speeds.

Multi layer fabrics enable the fabric designer to provide the papermaker with a fabric which can be designed for improved sheet support and fines retention in the sheet contact side, and on the machine contact side, for long wear life.

At the start of this trend, double layer forming fabrics led the way. Now, triple layer fabrics are seen as even better in meeting the need where sheet quality is of prime concern.

But in spite of this increased weaving sophistication, a significant percentage of fines are still lost during formation, because it has not been found practical to weave a forming fabric in sufficiently fine a mesh to prevent the escape of the smallest particles that exist in the furnish.

Only after an initial precoat of long fibers forms above or between adjacent strand members does the particle capture efficiency begin to increase. On many forming machines, the sheet comes under such severe agitation during this formation phase that the initial sheet precoat is disrupted repeatedly, causing recurrent losses of fines during much of this early dewatering phase.

During sheet formation, the forming fabric surface must be initially bridged over by particles in the furnish that are at least as long as the space between adjacent fabric elements. Until this happens, pore spaces between yarns serve as ready passageways for egress of small stock particles called fines.

After the initial bridging takes place, it is commonly assumed that the precoat forms up more or less permanently to thenceforth improve the particle capture efficiency of the combination of fabric and precoat; however, recent studies have shown that this is not always the case. Owing to high machine speeds and to disturbances during formation, turbulence takes place, with the result that the initial precoat is disrupted more than once, each time with the loss of more fines until the precoat again becomes established to prevent further loss of fines through the mesh.

The fines that are lost during sheet formation are fed back into the headbox, which increases the fines concentration of the furnish. This constant recycling can reduce the drainage rate for the machine. With regard to such loss of fines, it is known that under some conditions, even small differences in fabric mesh can effect fines retention significantly.

One of the drawbacks of multi layer woven forming fabrics is that particle matter penetrating through the relatively fine mesh of the sheet contact layer frequently lodges between the multiple layers of the fabric. To prevent the buildup of particle matter, intense showers are needed. Paper machines without such showering capability, particularly older, open draw machines, may have extreme difficulty in running these multi layer fabrics without incurring early fillup and plugging of the fabric. Thus, in addition to the premium papermakers must pay for the multi layered fabrics, they frequently have to add expensive auxilliary showering equipment to be able to operate these fabrics.

Perfection of the forming fabric is prerequisite to the production of high quality paper. In the case of endless woven forming fabrics, imperfections in the woven edges can cause sheet breakdown and disruption of operations. In the case of joined forming fabrics, the fabric must be very painstakingly joined into the form of an endless belt in order to operate on the paper machine. Even small discrepancies in the perfection of the fabric join may result in sheet breaks or loss of sheet quality. The presence of even slight imperfections in the weave may be cause for rejection of a very expensive finished forming fabric.

In the field, forming fabrics may be expected to operate satisfactorily for periods of from one to several months—unless they are subjected to some form of accidental damage. Then, efforts are made to restore the fabric to its original characteristics by patching the damaged area. In most cases, this is a time consuming task, and often, it is not possible to make a perfect repair.

Forming fabrics effectively form a paper sheet by capturing paper fibers on their sheet contact surface. They perform this function more or less efficiently based upon the fineness of the mesh. One way of expressing this fineness is the strand to strand distance. In even the finest forming fabrics, woven in multi layer weaves, the strand to strand distance exceeds the length of the fines by a very substantial margin.

Dryer fabrics for paper machines have for many years been supplied as flat belts and joined together after installation on the dryer with the aid of a pin seam.

More recently, wet press felts have been furnished in flat form and successfully joined together on the paper machine. Such ease of installation and seaming in place on the paper machine has never been possible for forming fabrics owing to the need for uniformity in the sheet contact surface of the forming fabric.

OBJECTIVES OF THE INVENTION

In view of the foregoing, it is an object of the present invention to significantly improve the fines retention of single layer forming fabrics by providing them with a nonwoven sheet contact layer which will act as the equivalent of a permanent precoat to reduce the loss of fines through the fabric.

Another objective of this invention is to enable a paper mill not equipped with high pressure showers to operate an improved single layer forming fabric which will provide higher fines retention than previous single layer forming fabrics.

A further objective of this invention is to provide means to improve the performance of multi layer forming fabrics still further through the addition of a permanent nonwoven precoat as the sheet contacting surface of these fabrics.

Another objective of this invention is to provide a nonwoven sheet contact surface layer for nonwoven forming fabrics such as the type described in U.S. Pat. No. 4,740,409.

It is another object of this invention to reduce the loss of fines through the surface of any type of forming fabric, thereby reducing sheet two sidedness and adding to sheet quality.

A still further objective of this invention is to reduce the occurrence of wire mark in the paper sheet.

Another objective of this invention is to reduce the penetration of fines through the sheet contact layer of the forming fabric, hereby reducing fillup during operation on the paper machine.

Still another objective of this invention is to submerge and cover up any underlying imperfections in the base fabric so that such abnormalities as may exist do not adversely impair the performance of the fabric nor the quality of the paper sheet made on the fabric.

A still further objective of the invention is to provide a sheet contact surface that may readily be repaired in the field following accidental damage.

It is another object of this invention to provide a permanent precoat in the form of a nonwoven fabric sheet contacting surface having a strand to strand distance less than can be achieved by present single or multiple layer weaving methods.

And finally, it is an objective of this invention to provide a sheet contact surface layer which can obscure an underlying base fabric seam, thereby enabling forming fabrics to be joined in the field for faster installation.

SUMMARY OF THE INVENTION

This invention achieves these and other objectives by means of a nonwoven sheet contact layer adhered to a base fabric layer, where the structural elements of the nonwoven sheet contact layer define vertical fluid flow passageways which are smaller than those in the base fabric layer. The preferred nonwoven sheet contact layer is further characterized in that substantially all of its structural elements encompass fluid flow passageways that vent directly to either the sheet side or to the base fabric side of the nonwoven sheet contact layer without first passing through further strata of fluid flow passageways.

The structural elements of the nonwoven layer reside substantially entirely in the transverse plane, which is the plane of the surface of the fabric. Between these structural members are void spaces which act as fluid flow passageways. Fluids can readily move upward or downward in the vertical plane through these fluid flow passageways which are defined by the sides of the transversely disposed structural elements which comprise the nonwoven sheet contact layer. Also, dependent upon the arrangements of the structural members, passageways may not extend entirely through the contact layer and may thus only be in contact with one of the transversely disposed surfaces.

The transversely disposed nonwoven sheet contact layer structural members define the limits of pore spaces located therebetween which act as fluid flow passageways, allowing liquid to move upward or downward in the vertical plane.

The nonwoven sheet contact layer may be comprised of fibers, filaments, monofilaments, open cell foam or the like, adhered to the base fabric layer by adhesive bonding, fusion bonding or other means.

BRIEF DESCRIPTION OF THE DRAWINGS

This invention may be clearly understood by reference to the attached drawings in which.

DETAILED DESCRIPTION OF THE INVENTION

Figure 1:
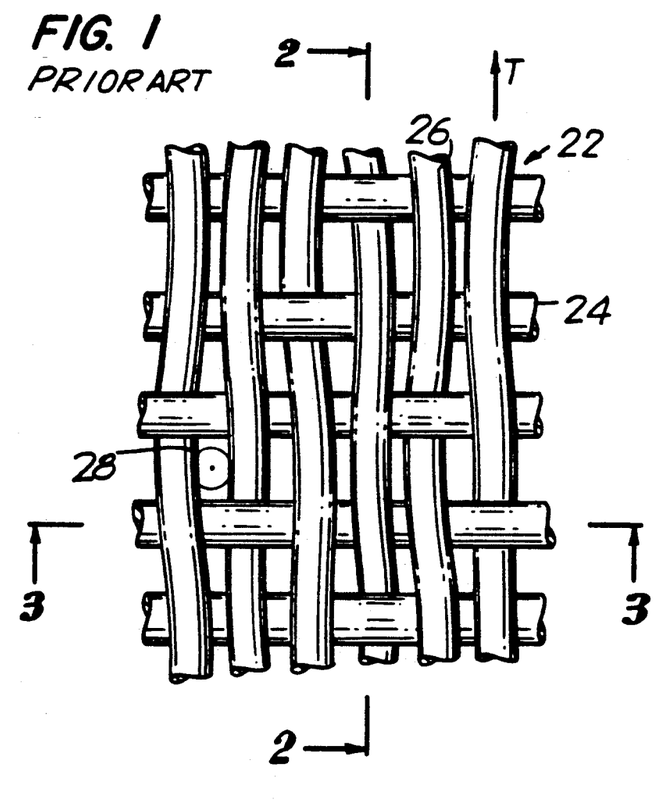
FIG. 1 is a fragmentary plan view of a forming fabric embodying the prior art.

FIG. 1 depicts a known single layer woven forming fabric 22 of the type described in U.S. Pat. No. 3,858,623, which is incorporated herein by reference, and which fabric comprises monofilament yarns woven endless so that the warp yarns 24 extend in the cross meachine direction and filling yarns 26 extend in the machine direction, which is depicted by the arrow T'.

In this prior art fabric, there are 32 yarns/cm in the machine direction providing a center to center distance of 0.31 mm and 20 yarns/cm in the cross machine direction providing a center to center distance of 0.5 mm. Typically, there are between 20 and 30 strands/cm in single layer fabrics, so that the average center to center distance between strands ranges between 0.33 mm and 0.5 mm.

Figure 2:
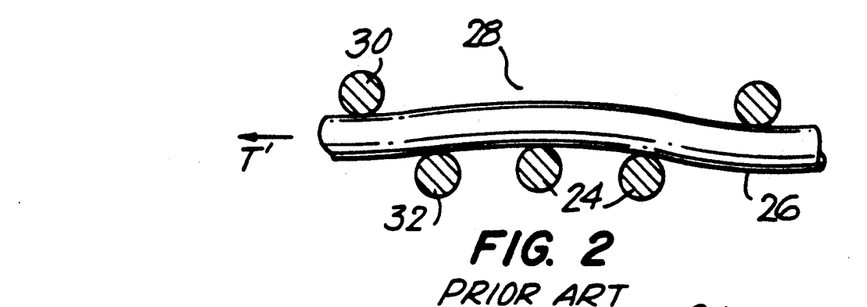
FIG. 2 is a sectional view along the line 2—2 in FIG. 1.
Figure 3:
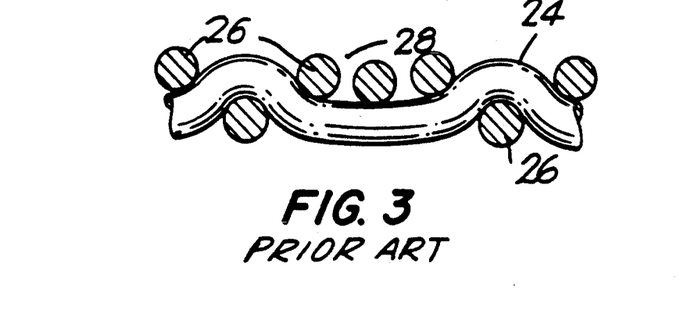
FIG. 3 is a sectional view along the line 3—3 of FIG. 1.

This prior art single layer fabric is woven in a four harness satin weave, where cross machine direction yarns interlace with every fourth machine direction yarn. As can clearly be seen in FIGS. 2 and 3, this interlacing pattern prevents the yarns from forming a flat surface for sheet formation. For example, it is not likely that a fiber may easily bridge between adjacent cross machine direction yarns at positions 30 and 32 since they do not reside in a single plane.

The average length of softwood fibers is 3 mm–3.5 mm, whereas hardwood fibers average about 1.0 mm. It is known that fibers must be considerably longer than the center to center distance between support strands in the sheet contact surface to achieve an appreciable probability of being retained on the strands.

In one theoretical study, average fiber length was kept in the same length range as the strand to strand distance and this distance was the same in the machine direction and cross machine direction. All the strands were assumed to lie in the same plane. Under these assumptions, it was calculated that: where the strand to strand distance was equal to the fiber length, only about 15% initial retention would occur; where the center to center distance was half the fiber length, initial retention would increase to 75% and where the center to center distance was one quarter the average fiber length, initial retention would increase to over 90%. Strand frequency may vary in the range of one quarter to one tenth fiber length with little further effect upon retention, according to this study. (Refer to Helle, Torbjorn "Fiber web support of the forming wire", Tappi Journal, January, 1988.) For example, on the basis of this theoretical treatment, if it is assumed that the average fiber length is 1.0 mm, then to achieve over 90% retention, strand to strand distance would have to be about 0.25 mm, which is equivalent to a strand frequency of 40 strands/cm—well above the usual range for single layer fabrics. In addition, such strands would have to lie in the same plane to achieve this efficiency.

Actual thermomechanical pulps contain widely varying fiber lengths. For an average of several pulps, it was found that whereas 52% of the weighted average fiber length exceeded 1.3 mm, 35% of the weighted average fiber length was less than 0.4 mm long. Included in this 35% are the fines, defined as fibers less than 75 micrometers long. It is generally conceeded that woven strands do not efficiently capture fines and that the fines are retained on the sheet forming surface by the combination of fabric and long fibers that bridge between strand support members to establish a precoat. To further illustrate the relationship of the forming fabric surface to the fines, a single fines fiber 28 measuring 75 micrometers in length is shown to scale in FIGS. 1, 2, and 3. It should be recalled that this 75 micrometer length is the upper limit for the fines fraction, and that many fines are much shorter than this.

From all of the foregoing, it should be clear that when strand to strand distances in the supporting sheet contact layer are significantly less than the average fiber length, better initial fines retention will occur, and that even small differences in the strand to strand distance through the critical range can vastly effect initial fines retention and sheet quality.

It should also be clear that a substantial part of the fines contained in any furnish will likely pass through this prior art fabric, where strand to strand distances are much larger than the length of the fines.

Figure 4:
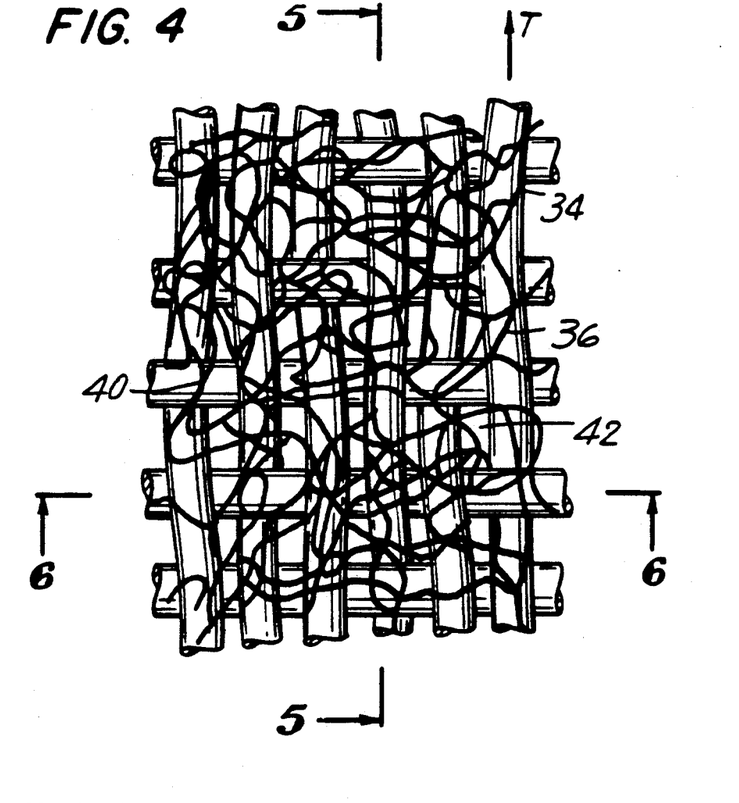
FIG. 4 is a fragmentary plan view of one forming fabric of the present invention.
Figure 5:
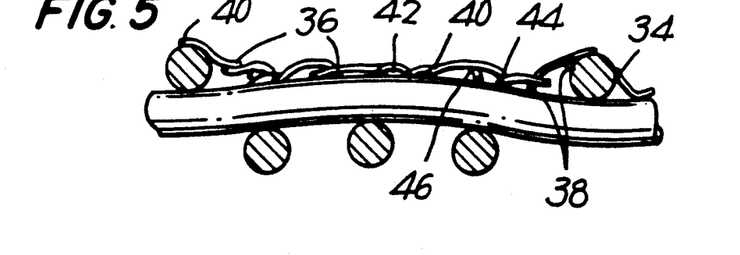
FIG. 5 is a sectional view along the line 5—5 in FIG. 4.
Figure 6:
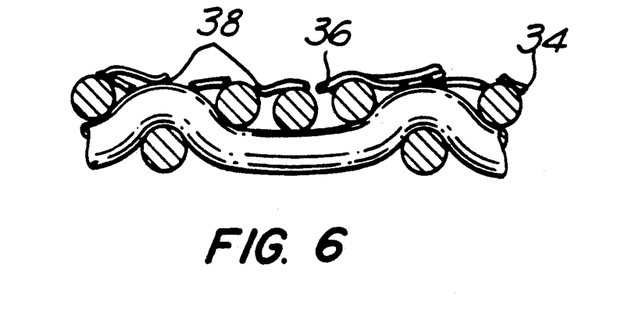
FIG. 6 is a sectional view along the line 6—6 in FIG. 4.

FIG. 4 shows one embodiment of the invention where a nonwoven sheet contact layer 34 comprised of randomly disposed continuous filaments 36 are adhered to the sheet forming side of the same prior art fabric 22 to provide a closer mesh sheet contact layer having a reduced strand to strand distance than the prior art fabric had in its original state. The filaments in this nonwoven sheet contact layer are adhered to the topmost surfaces of the base fabric layer at each point of contact 38. The filaments are adhered to each other at each point of contact 40. The porous passageways 42 formed between filament members vent directly to either the sheet side 44 or to the base fabric side 46 of the nonwoven sheet contact layer.

Means for producing such continuous filament randomly disposed arrays are well known. Such means include, for example, the random array hot melt filament applicator known as the Acu-Fiber system made by Acumeter Laboratories, Marlborough, MA. In the preferred embodiment, the filaments would be comprised of a thermoplastic material that would adhere to the base fabric material. For example, in the case where the base fabric was comprised of polyester, the nonwoven monofilaments would preferably be comprised of thermally bondable lower melting temperature polyester, a copolyester, or some other fuseable thermoplastic that would adhere well to the polyester base fabric and would be suitable for use on paper machines.

The diameter of the filaments may range from less than 25 micrometers to more than 150 micrometers, but will in most cases fall within this range, since fibers smaller than 25 micrometers may not provide adequate life on the paper machine and fibers above 150 micrometers may not allow for the desired close strand to strand spacing without excessively limiting the size of fluid flow passageways between strand members.

Using the randomly disposed pattern may at first consideration seem to be a disadvantage, when compared to the stringent pattern uniformity requirements in woven base fabrics; however, there are two reasons why the random pattern may be tolerated without quality sacrifice in this nonwoven sheet contact layer.

First, pattern perfection in woven fabric is needed because the average strand to strand distance is large in comparison to the fiber length of the furnish, and as already shown, small differences in such large spans between support strands can lead to substantial differences in fines retention. In comparison, the average strand to strand distance in the nonwoven sheet contact layer must be smaller than in the base fabric layer to limit fines passage into the base layer, and also, to provide improved sheet support with resultant improved fines retention. Furthermore, by controlling the strand disposition without consideration of weaving constraints, it is entirely within reach to provide a strand to strand average spacing well above the most sensitive range, such that variations in actual strand to strand distance will in almost all cases, still yield spans that are readily bridgeable and hence, conducive to a rapid establishment of a precoat.

Second, the most serious weave imperfections involve conditions which span across major dimensions of the fabric. Owing to the woven nature of the fabrics, such defects are usually aligned with either the machine direction or cross machine direction yarn systems. Any woven machine direction imperfection that involves an irregular span between support strands could result in a continuous paper sheet defect. Any cross direction weave imperfection involving a change in support strand frequency could cause sheet breaks. In the case of the random nonwoven sheet contact surface: first, the occurrence of a larger than ordinary gap between support strands is not likely to result in a significant sheet defect because such a defect would not likely occur in a full width or full length pattern that would be readily detectable in the sheet; and second, by reducing the average span between strands to less than the average distance between strands in the base fabric, the importance of small differences between support strand distances is lessened.

Figure 7:
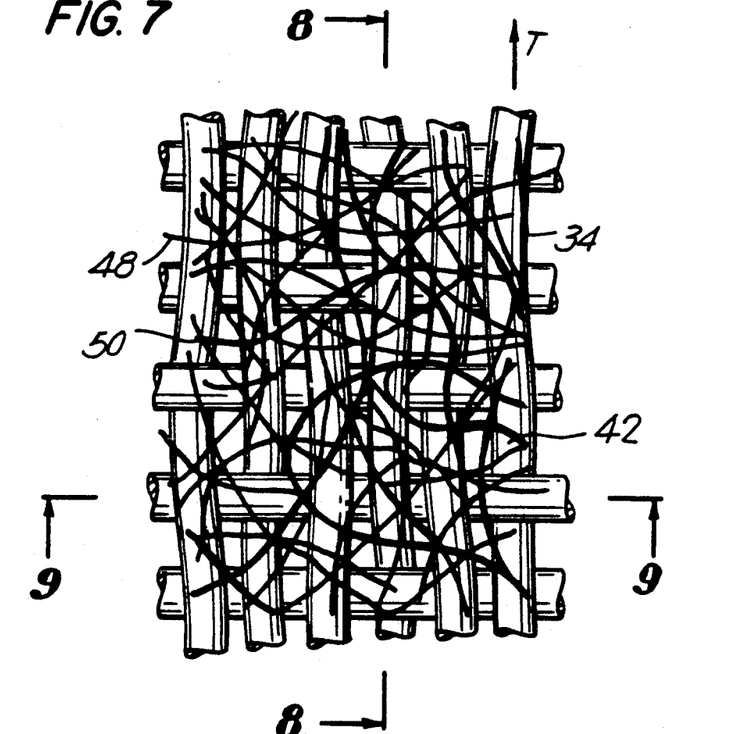
FIG. 7 is a perspective view of another fabric of the invention.
Figure 8:
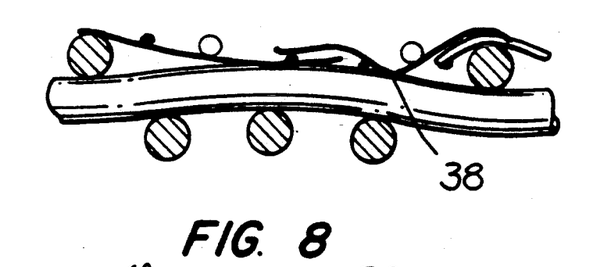
FIG. 8 is a sectional view along the line 8—8 in FIG. 7.
Figure 9:
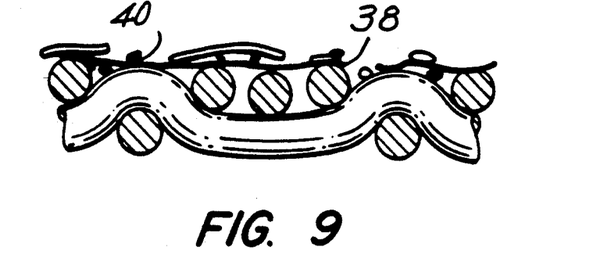
FIG. 9 is a sectional view along the line 9—9 in FIG. 7.

FIG. 7 shows an example of a sheet contact layer adhered to a woven single layer forming fabric 22 of the same prior art, where the layer is comprised of a blend of fine staple fibers 48 combined with coarse fibers 50. These fibers are entangled with each other and adhered to each other and to the base fabric at points of contact.

The fibers lie in a single layer, such that substantially all of the fluid flow passageways between fiber strands are in fluid communication with either the sheet side or the underside of the nonwoven layer. Furthermore, the average span measured in the transverse plane, i.e., in the plane of the fabric surface, measured between adjacent structural members in the nonwoven layer is smaller than the average span between adjacent structural members in the base fabric layer to which the nonwoven is bonded.

In the preferred case, substantially all of the pore spaces within the nonwoven sheet contact layer vent directly to either surface of the nonwoven layer without first passing through an additional series of pores which do not vent directly to the nonwoven surfaces.

From the foregoing, it should be readily apparent that many ordinary nonwoven fabric would not be suitable for incorporation in the structure of this invention. For example, nonwoven materials mechanically bonded together by needle punching would of necessity contain a multiplicity of superimposed fibrous layers which might serve to entrap fines within internal pore spaces.

It has been found that flock fibers of from 0.1 to 1 centimeter in length can be applied uniformly to the surface of a base fabric by first coating the fabric surface with a tacky conductive adhesive and then applying the fibers by known electrostatic flock application means. The flock fibers will at first be disposed principally in the vertical plane with respect to the fabric surface. Subsequent treatment with heat and pressure is needed to consolidate the flock into the permanently adhered transverse oriented porous sheet contact layer of the invention.

In the preferred case, such flock fibers would be adhered to each other and to the base fabric by fusion bonding means. Bicomponent fibers such as those made by Hoechst Celanese Corporation, Charlotte, NC, having a polyester core and a lower melting temperature copolyester sheath, may be ideally suited for this capping layer, although other fiber types may also prove useful.

Figure 10:
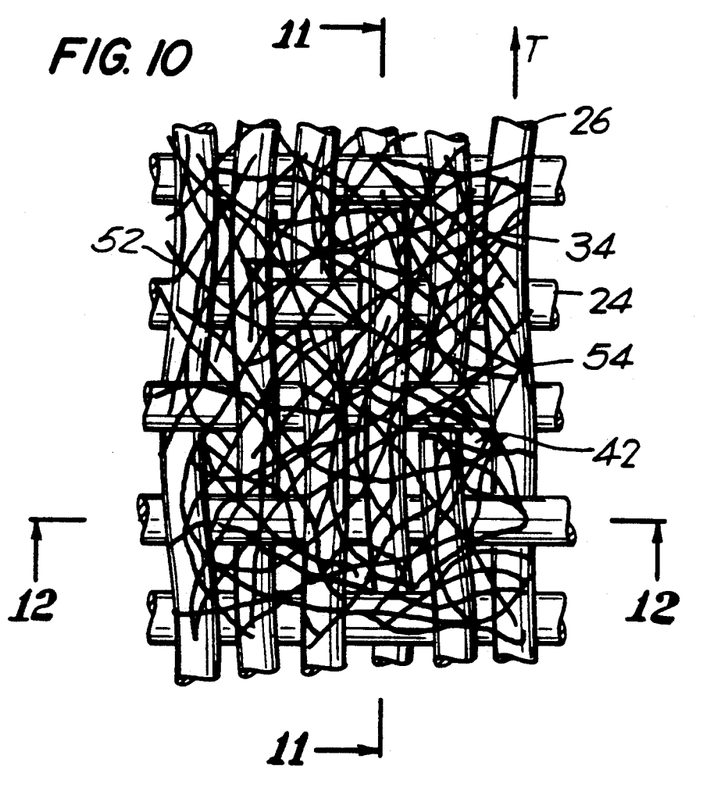
FIG. 10 is a perspective view of another fabric of the invention.
Figure 11:
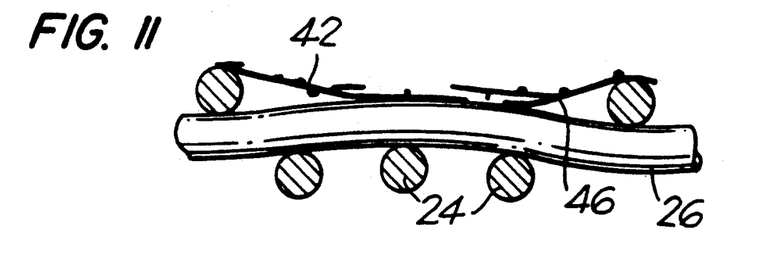
FIG. 11 is a sectional view along the line 11—11 in FIG. 10.
Figure 12:
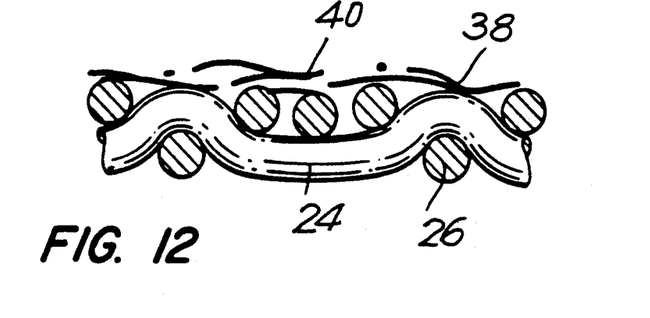
FIG. 12 is a sectional view along the line 12—12 in FIG. 10.

Other means of forming a suitable nonwoven layer include deposition from a wet fiber slurry, such as illustrated in FIG. 10. Here, a wet formed random fiber nonwoven array 52 is adhered to the same known forming fabric as described earlier. Non crimped short fibers 54 under 1 cm in length are first disbursed in a wet slurry containing a dilute resin binder. Formation is achieved by well known means, except at slower speed. If at least some of the web fibers are of lower melting temperature, and possess high melt viscosity, the web adhesion to the base fabric may be enhanced by fusing such fibers to the base fabric. This example illustrates very short strand to strand distances, with the likelihood of affording high initial fines retention.

As shown in FIG. (10), the random nonwoven fiber coverage on the base fabric results in some localized spots where fiber coverage is above average and other localized spots where fiber coverage is below average. It has been found through experimentation that such localized fiber distribution differences have little if any effect upon sheet quality because they only extend over small areas and because even in the case where the distance between support strands is below average for the nonwoven layer, the span distance is still smaller than in the underlying base fabric.

Figure 13:
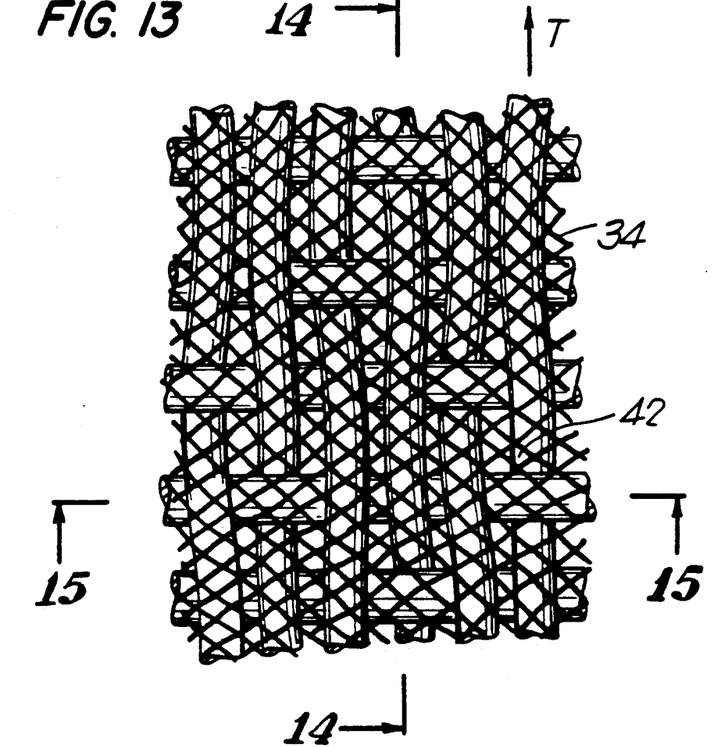
FIG. 13 is a perspective view of another fabric of the invention.
Figure 14:
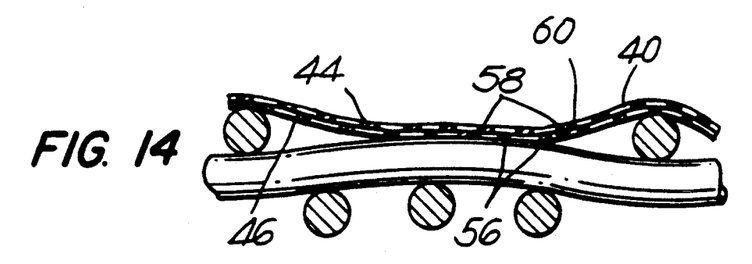
FIG. 14 is a sectional view along the line 14—14 in FIG. 13.
Figure 15:
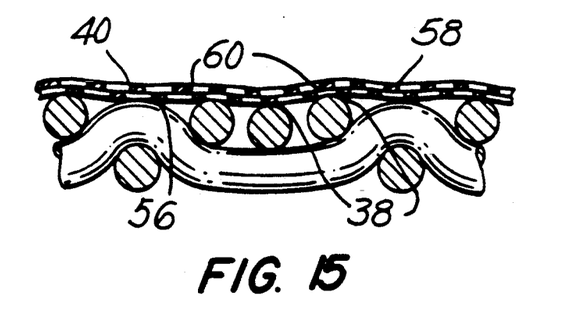
FIG. 15 is a sectional view along the line 15—15 in FIG. 13.

FIG. (13) shows a nonwoven sheet contact layer comprised of two sets of parallel diagonally oriented monofilament strands attached perpendicularly to each other and to the same known base fabric by fusion bonding means. In this example, monofilaments 56 adhered directly to the surface of the woven fabric 22. Monofilaments 58 in the second diagonal set adhere primarily to the contacting surfaces 60 of the first diagonal set. Notice that strand to strand distance in the transverse plane of the nonwoven sheet contact surface is less than in the base fabric layer adjacent to the nonwoven, and that the nonwoven layer contains fluid flow passageways that vent directly to either the sheet side or to the base fabric side of the nonwoven layer.

Many variations in the processes and materials may be made without departing from the scope of this invention. For example, in considering the formation of a nonwoven precoat on the surface of a forming fabric from a wet slurry, it is not necessary to restrict such materials to textile fibers only.

What is desired is a reduction in the average distance between sheet support surfaces, and any durable particle which can accomplish this purpose without adversely reducing drainage rate may be considered an appropriate candidate for this purpose. Thus, very short fibers, fibrids and even particles of nondiscript shape may be considered appropriate.

For example, such particles may be suspended in a resinous slurry which when drained through the forming fabric by known means will produce a coating of particles that bridge across interstices between support surfaces in the base fabric. These small particles could be bonded in place by drying and curing the resin binder, although adhesion may be greatly enhanced if the particles are themselves fusible under the influence of elevated temperature or other means.

The result will be a permanently adhered fine pore size nonwoven precoat adjacent the top surface of the underlying base fabric such that, during sheet formation, the precoat will limit the escape of fines and improve sheet quality. Although not illustrated, it is also possible to produce fabrics of the invention through the adhesion or direct formation of porous reticulated plastic foam as the sheet contact layer, provided that the average distance between support members in the nonwoven layer is less than the average distance between support members in the base layer, and that fluid flow passageways between nonwoven members are in communication with the sheet contact surface, the base fabric surface, or both.

EXAMPLES

Several prototype fabrics of the invention were constructed and evaluated compared to the original control fabrics using the dynamic drainage jar, described by Britt et al in their July 1986 Tappi Journal article entitled "Observations on Water Removal in Papermaking".

Experimental fabric A utilized a woven double layer forming fabric treated with a light coating of 3 denier nylon flock that had been cut to a precise 0.75 mm length. The flocking was applied by electrostatic means to the adhesive treated sheet contact surface of the double cloth fabric. The adhesive was then dried and the flock was hot pressed to form the fibers into a porous smooth nonwoven transverse oriented sheet contact layer that obscured about 30% of the woven fabric surface layer in contact with the nonwoven layer. Experimental fabric B was prepared in a like manner as fabric A and utilized the same woven double cloth base fabric and the same flock fiber, the exception being that a slightly heavier coating of fibers was applied such that the completed transverse fabric surface layer obscured about 40% of the woven fabric surface layer in contact with the nonwoven layer.

In tests utilizing a Canadian 50/50 blend of hardwood and softwood stock with 10% total fines, it was found that while making 35 gram per square meter sheet, the original double cloth fabric provided 33% fines fraction retention versus 63% fines fraction retention for fabric A. When the same stock was used to produce 50 grams per square meter sheet, the original double cloth yielded only 18% fines fraction retention versus 48% fines fraction retention for fabric A.

Further testing was carried out at a sheet weight of 35 grams per square meter utilizing a U.S. manufacturer's top liner stock having 27% fines fraction. The same double cloth control fabric yielded 28% fines fraction retention, versus 41% for experimental fabric A and 51% for experimental fabric B. The time to form the sheet and the total vacuum pressure applied during sheet formation were both monitored. There was no significant increase in sheet forming time or vacuum pressure level during sheet formation with the experimental fabrics compared to the control fabrics. Sheet smoothness and formation were observed visually to be of equal quality between the control and experimental fabric materials. The sheet released equally well from these three materials and there was no visual indication of fillup within the very thin transverse oriented capping layer of the experimental fabrics. These results indicate that fabrics of the invention can significantly increase fines retention under the dynamic sheet formation conditions that occur during the papermaking process.

The embodiments which have been described herein are but some of several which utilize this invention and are set forth here by way of illustration but not limitation. It is obvious that many other embodiments which will be readily apparent to those skilled in the art may be made without departing materially from the spirit and scope of this invention.

I claim:

1. An improved forming fabric for a papermaking machine having a machine engaging surface and a sheet support surface wherein the improvement comprises:
    machine direction and cross machine direction yarns interwoven to form a base fabric, said base fabric having a machine engaging surface and an opposite surface, said opposite surface extending in a plane; and
    a non-woven array of fibrous strands adhered to said opposite surface and forming fluid flow passageways between said fibrous strands which extend from one surface of said array of fibrous strands to an opposite surface of said array of fibrous strands without first passing through any other fluid flow passageways located between said one surface and said opposite surface of said array of fibrous strands, substantially all of said fibrous strands extending in the direction in which said plane extends, first portions of said opposite surface being covered by said fibrous strands and second portions of said opposite surface not being covered by said fibrous strands, the sum of the areas of said first portions being less than the sum of the areas of said second portions, said first portions and said second portions collectively forming said sheet support surface, said sheet support surface having structural elements formed by said yarns and said fibrous strands, the average span between adjacent structural elements in said sheet support surface being smaller than the average span between adjacent yarns in said base fabric.

2. The forming fabric of claim 1 where the base fabric is a single layer woven fabric.

3. The forming fabric of claim 1 where the base fabric is a double or triple layer woven fabric.

4. The forming fabric of claim 1 where the fibrous strands comprise fibers or filaments bonded to each other and to the base fabric at points of contact.

5. The forming fabric of claim 4 where the fibers or filaments are adhered to one another and to the base fabric by adhesive resin or fusion bonding means.

6. The forming fabric of claim 1 where the nonwoven array contains bicomponent fiber or filaments, the outer sheath of which contains polymeric material of lower melting temperature than the fiber core and the base fabric material.

7. The forming fabric of claim 6 where the bicomponent fiber or filament is comprised of a polyester core and a lower melting temperature copolyester sheath material.

8. The forming fabric of claim 1 where the fibrous strands are comprised of fibers or filaments arranged in a random distribution pattern.

9. The forming fabric of claim 1 where the nonwoven array is comprised of monofilament material.

* * * * *